US012130722B2

(12) United States Patent
Bonic et al.

(10) Patent No.: US 12,130,722 B2
(45) Date of Patent: Oct. 29, 2024

(54) PROCESSING CONTINUOUS INTEGRATION FAILURES

(71) Applicant: Red Hat, Inc., Raleigh, NC (US)

(72) Inventors: Janos Bonic, Vienna (AT); Sanja Bonic, Vienna (AT); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 469 days.

(21) Appl. No.: 17/484,747

(22) Filed: Sep. 24, 2021

(65) Prior Publication Data

US 2023/0098474 A1 Mar. 30, 2023

(51) Int. Cl.
*G06F 11/36* (2006.01)
*G06F 8/71* (2018.01)
*G06F 16/25* (2019.01)
*G06F 17/18* (2006.01)

(52) U.S. Cl.
CPC ............ *G06F 11/3612* (2013.01); *G06F 8/71* (2013.01); *G06F 16/258* (2019.01); *G06F 17/18* (2013.01)

(58) Field of Classification Search
None
See application file for complete search history.

(56) References Cited

U.S. PATENT DOCUMENTS

| 8,533,676 | B2 | 9/2013 | Watters et al. |
| 9,372,690 | B2 * | 6/2016 | Greene ................... G06F 16/25 |
| 10,754,641 | B2 | 8/2020 | Chen et al. |
| 10,884,893 | B2 | 1/2021 | Sobran et al. |
| 10,963,242 | B2 | 3/2021 | Thomas, Jr. et al. |
| 2017/0039492 | A1* | 2/2017 | Henke ................ G06Q 10/0633 |
| 2018/0189055 | A1* | 7/2018 | Dasgupta ............ G06F 11/3692 |
| 2019/0317885 | A1 | 10/2019 | Heinecke et al. |
| 2020/0226056 | A1* | 7/2020 | Haubold ............. G06F 11/3688 |
| 2020/0257514 | A1* | 8/2020 | Gadgil .................... H04L 67/34 |
| 2021/0211407 | A1* | 7/2021 | Ochs-Willard ..... H04L 63/0209 |

OTHER PUBLICATIONS

Islam et al., "Insights into Continuous Integration Build Failures," IEEE/ACM, 2017. (Year: 2017).*

(Continued)

*Primary Examiner* — Ryan D. Coyer
(74) *Attorney, Agent, or Firm* — Dority & Manning, P.A.

(57) ABSTRACT

Processing continuous integration failures is provided herein. In particular, a computing device comprising a processor device identifying a failed continuous integration job of a continuous integration system is provided. The continuous integration system is configured to process continuous integration jobs in a shared source code repository for merging source code changes of the continuous integration jobs into a main codebase comprising a collection of source code. The computing device identifies a plurality of artifacts generated by the continuous integration system in relation to the failed continuous integration job. The computing device extracts predetermined target data from the plurality of artifacts. The computing device processes the extracted target data to generate at least one standardized dataset in a structured format. In certain implementations, the at least one standardized dataset is processed to determine a failure feature, and automatically take corrective action based on the failure feature.

20 Claims, 12 Drawing Sheets

(56) References Cited

OTHER PUBLICATIONS

Jin et al., "A Cost-efficient Approach to Building in Continuous Integration," IEEE/ACM, 2020. (Year: 2020).*

Lou et al., "History-Driven Build Failure Fixing: How Far Are We?" ACM, 2019. (Year: 2019).*

Saidani et al., "Predicting continuous integration build failures using evolutionary search," Elsevier, 2020. (Year: 2020).*

Kahles, J. et al., "Automating Root Cause Analysis via Machine Learning in Agile Software Testing Environments," 2019 IEEE 12th International Conference on Software Testing, Verification and Validation (ICST 2019), Jun. 2019, IEEE, 14 pages.

Truong, A. et al., "Clustering and Classification of Test Failures Using Machine Learning," Master's Thesis, Department of Computer Science, Faculty of Engineering LTH, Lund University, Jun. 2018, 67 pages.

* cited by examiner

PROCESSING CONTINUOUS INTEGRATION FAILURES

BACKGROUND

Continuous integration is the process of frequently integrating code into a shared source code repository, and then merging the code into a main codebase storing a collection of source code.

SUMMARY

The examples disclosed herein provide processing continuous integration failures. In particular, a method includes receiving, by a computing device comprising a processor device, a failed continuous integration job of a continuous integration system. The continuous integration system is configured to process continuous integration jobs in a shared source code repository for merging of source code changes of the continuous integration jobs into a main codebase comprising a collection of source code. The method further includes identifying, by the computing device, a plurality of artifacts generated by the continuous integration system in relation to the failed continuous integration job. The method further includes extracting, by the computing device, predetermined target data from the plurality of artifacts. The method further includes processing, by the computing device, the extracted target data to generate at least one standardized dataset in a structured format.

In one example, a method is provided. The method includes receiving, by a computing device comprising a processor device, a failed continuous integration job of a continuous integration system. The continuous integration system is configured to process continuous integration jobs in a shared source code repository for merging of source code changes of the continuous integration jobs into a main codebase comprising a collection of source code. The method further includes identifying, by the computing device, a plurality of artifacts generated by the continuous integration system in relation to the failed continuous integration job. The method further includes extracting, by the computing device, predetermined target data from the plurality of artifacts. The method further includes processing, by the computing device, the extracted target data to generate at least one standardized dataset in a structured format.

In another implementation, a system is disclosed. The system includes a computing device comprising a processor device to identify a failed continuous integration job of a continuous integration system. The continuous integration system is configured to process continuous integration jobs in a shared source code repository. The processor device is further to identify a plurality of artifacts generated by the continuous integration system in relation to the failed continuous integration job. The processor device is further to extract predetermined target data from the plurality of artifacts. The processor device is further to process the extracted target data to generate at least one standardized dataset in a structured format. The processor device is further to access the at least one standardized dataset in the structured format. The at least one standardized dataset compiled from the extracted target data from the plurality of artifacts generated by the continuous integration system in relation to the failed continuous integration job. The processor device is further to apply at least one failure detection process to the at least one standardized dataset to determine at least one failure feature of the at least one standardized dataset. The processor device is further to store a label associated with the at least one standardized dataset corresponding to the at least one failure feature of the at least one standardized dataset.

In another implementation, a computer program product is disclosed. The computer program product is stored on a non-transitory computer-readable storage medium and includes instructions to cause a processor device to identify a failed continuous integration job of a continuous integration system. The instructions further cause the processor device to identify a plurality of artifacts generated by the continuous integration system in relation to the failed continuous integration job. The instructions further cause the processor device to extract predetermined target data from the plurality of artifacts. The instructions further cause the processor device to process the extracted target data to generate at least one standardized dataset in a structured format. The instructions further cause the processor device to access the at least one standardized dataset in the structured format. The at least one standardized dataset is compiled from the extracted target data from the plurality of artifacts generated by the continuous integration system in relation to the failed continuous integration job. The instructions further cause the processor device to apply at least one failure detection process to the at least one standardized dataset to determine at least one failure feature of the at least one standardized dataset. The instructions further cause the processor device to store a label associated with the at least one standardized dataset corresponding to the at least one failure feature of the at least one standardized dataset. The instructions further cause the processor device to determine a corrective action based on the label. The instructions further cause the processor device to initiate the continuous integration system to execute the continuous integration job with the corrective action.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
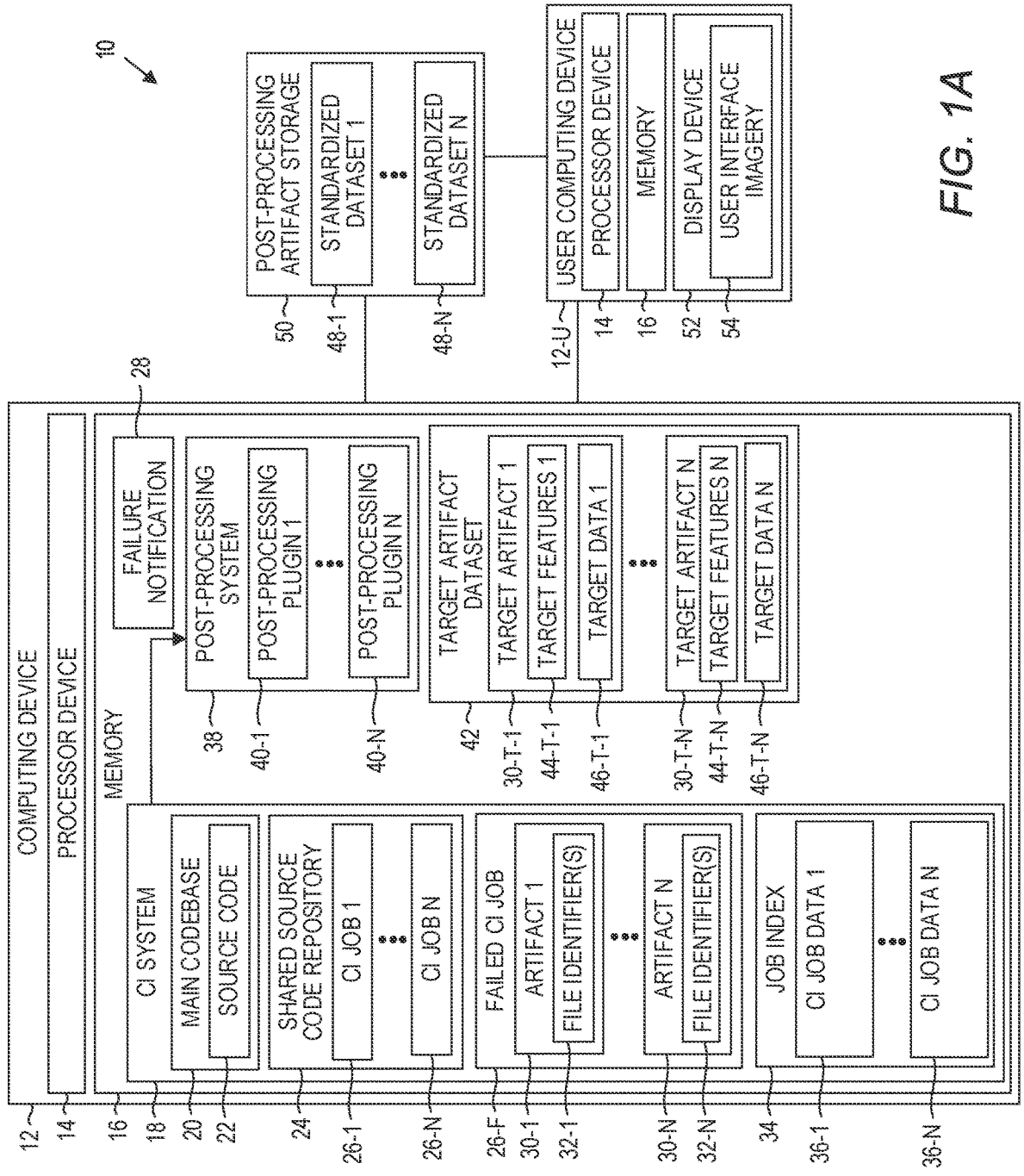
FIG. 1A is a block diagram of a computing system to process continuous integration (CI) failures to generate a standardized dataset according to one example.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Continuous integration (CI) is the process of frequently integrating code into a shared source code repository, and then merging the code into a main codebase storing a collection of source code. CI systems can produce a large number of artifacts. Each CI system, and often individual CI job types, produce their own set of artifacts, unique to that CI system and/or CI job type. For example, an OpenShift on Red Hat Virtualization job produces artifacts A, B, and C, while an OpenShift on OpenStack job produces artifacts A, D, and E. Even if both are artifacts containing the same or similar kinds of data, such as performance metrics, the artifacts may be in different locations, different formats, and/or unstructured. Troubleshooting a failed CI job, which may be gigabytes worth of data, can be difficult, cumbersome, and time-consuming. CI systems do not contain interfaces to facilitate a user to easily and quickly extract and display relevant artifact information. Instead, a user opens each artifact individually, potentially loading them into the corresponding appropriate software to view and display the artifact for the user to manually read the artifact.

Disclosed herein is a computing system that automatically processes artifacts to extract and convert target data into a standardized format, such as graphs, images, timelines, charts, and/or tables. The target data is a subset of the total data produced by the artifacts, thereby focusing efforts to the most relevant portions of the total artifact data. Further, generating the target data in a standardized format facilitates ease of review of such data. Accordingly, results of multiple artifacts may be visually displayed, facilitating review by a user to quickly analyze the target data in context. In certain implementations, a classifier automatically classifies the standardized target data and stores a label regarding the classification. Doing so further facilitates review of such data and troubleshooting why a CI job failed. Also, in certain implementations, the classifier automatically takes corrective action depending on the classifications and/or combination of classifications.

FIG. 1A is a block diagram of a computing system to process CI failures using a post-processing system according to one example. The computing system 10 includes a computing device 12, which in turn includes a processor device 14 coupled to a memory 16. It is noted that for illustrative purposes to reduce space, only some of the computing devices 12 and other computer components are shown with a processor device 14 and a memory 16. However, each of the computing devices 12 and/or other computer components may include a processor device 14 and/or a memory 16. Further, each of the computing devices 12 may include a plurality of computing devices 12. Collectively, the processor devices 14 may be referred to as a processor device set 14.

It is noted that while, for purposes of illustration and simplicity, the implementations are illustrated as being implemented by a processor device set that includes a single processor device 14 on a single computing device 12, in other environments, such as a distributed and/or clustered environment, the implementations may be implemented on a computer system 10 that includes a processor device set that includes a plurality of processor devices 14 of a plurality of different computing devices 12, and functionality of the implementations may be implemented on different processor devices 14 of different computing devices 12. Thus, irrespective of the implementation, the implementations may be implemented on a computing device 12 that includes a processor device set made up of one or more processor devices 14 of one or more computing devices 12.

Continuous integration is part of the automation of integrating code changes from multiple contributors into a single software project. The computing device 12 includes a CI system 18 having a main codebase 20 containing source code 22. A main codebase 20 is a collection of source code 22 to build a software program, application, and/or software component, or the like. In certain implementations, the main codebase is the complete body of source code 22 for the software program, application, and/or software component. The main codebase 20 may be stored in a source control repository in a version control system. Accordingly, CI is part of the automation of integrating code changes into the main codebase 20. The CI system 18 runs automated jobs to check quality of source code changes before merging the source code changes into the source code 22. For example, the CI system 18 may compile source code, run automated tests, check source code for mistakes, or the like. In certain implementations, the CI system 18 integrates the source code changes into the source code 22. In certain implementations, the CI system 18 approves the source code changes, but another system integrates the changes into the source code 22. In certain implementations, a version control system may be used as part of or be separate from the CI system 18 to store the main codebase 20 and/or the source code changes.

To integrate code changes, the CI system 18 further includes a shared source code repository 24 including a plurality of CI jobs 26-1-26-N (referred to generally as CI jobs 26). At least some CI jobs 26 represent submitted changes to the source code 22 of the main codebase 20. A user submits a CI job 26 to the shared source code repository 24, and the CI system 18 may then automatically test and validate the CI job 26. For example, the CI system 18 may run tests for basic errors, vulnerabilities, coding standard adherence, or the like. The CI system 18 processes the CI job 26 in a shared source code repository 24 for merging of source code changes of the CI job 26 into the main codebase 20. Accordingly, once the CI job 26 is tested and validated, the CI job 26 can be merged with the source code 22 of the main codebase 20. If the CI job 26 fails, then a failure notification 28 may be sent regarding the failed CI job 26-F.

Each CI job 26, including the failed CI job 26-F, produces raw artifacts 30-1-30-N (referred to generally as artifacts 30). In certain implementations, at least a portion or all of the plurality of artifacts 30 are raw and unprocessed. The raw artifacts 30 may include binaries compiled from the source code, log files, JSON files, time-series databases, compressed data sets, or the like. Log files may include text files with timestamps. JSON files may be of varying formats, and include information related to timing of certain events, metrics, or the like. Time-series databases include raw data dumps from metrics software, such as Prometheus. Compressed data sets may incorporate any of these data types. Each of the artifacts 30 may include file identifiers 32-1-32-N (referred to generally as file identifiers 32). File identifiers 32 may include file name, file type, file location, or the like.

The CI system 18 further includes a job index 34 containing CI job data 36-1-36-N (referred to generally as CI job data 36) corresponding to respective CI jobs 26, even for failed CI jobs 26-F. For example, CI job data 36 may include metadata about the CI job 26, as well as identify storage locations for artifacts 30 related to the corresponding CI job 26.

For failed CI jobs 26-F, the CI system 18 may send a failure notification 28 to a post-processing system 38. The job index 34 may include a status of each CI job 26, such as queued, running, complete, failed, or the like. Accordingly, in certain implementations, the post-processing system 38 monitors the job index 34 for changes in status of a CI job 26 to failed. The post-processing system 38 identifies a failure notification 28, such as by receiving the failure notification 28 or monitoring the job index 34. When the post-processing system 38 identifies a failure, such as by a failure notification 28, the post-processing system 38 retrieves or otherwise accesses the failed CI job 26-F, such as by using the job index 34.

Because the post-processing system 38 is a component of the computing device 12, functionality implemented by the post-processing system 38 may be attributed to the computing device 12 generally. Moreover, in examples where the post-processing system 38 comprises software instructions that program the processor device 14 to carry out functionality discussed herein, functionality implemented by the post-processing system 38 may be attributed herein to the processor device 14.

The post-processing system 38 includes a plurality of post-processing plugins 40-1-40-N (referred to generally as post-processing plugins 40). The post-processing system 38 identifies a target artifact dataset 42 of target artifacts 30-T-1-30-T-N (referred to generally as target artifacts 30-T), such as by target features 44-T-1-44-T-N (referred to generally as target features 44-T) of the target artifacts 30-T. Each target artifact 30-T may include target features 44-T and target data 46-T-1-46-T-N (referred to generally as target data 46-T) corresponding to the target features 44-T. The post-processing system 38 extracts predetermined target data 46-T from the target artifacts 30-T, and then generates standardized datasets 48-1-48-N (may be referred to generally as standardized datasets 48) in a structured format, such as based on the target data 46-T extracted. Accordingly, the post-processing plugins 40 allow for granular capture and interrogation of artifacts 30-T with similar configurations, data, layout, or the like. Further, the post-processing plugins 40 only identify a subset of the total artifacts 30 as being a target artifact 30-T, thereby culling the total data to the most relevant data.

Each post-processing plugin 40 receives from the post-processing system 38, such as via the failure notification 28, job metadata, and/or artifacts 30 related to the failed CI job 26-F. Each post-processing plugin 40 is configured, such as by an extraction routine, to identify predetermined target data 46-T and/or target artifacts 30-T from the plurality of artifacts 30. In particular, a post-processing plugin 40 of the post-processing system 38 detects target features 44-T associated with a target artifact 30-T, where the target features 44-T correspond to a likelihood that the target artifact 30-T includes the target data 46-T.

Target features 44-T may be related to file identifiers 32 of the artifacts 30. Target features 44-T may include file name, suffix of a file name, file type, file location, file content, or the like. For example, a post-processing plugin 40 may be configured to identify a target artifact 30-T based on the file name of the artifact 30, such as file names with a suffix of .json or .wal. A post-processing plugin 40 may be configured to identify a target artifact 30-T based on the folder location of the artifact 30 or based on the file type of the artifact 30.

Each post-processing plugin 40 is configured to search for and extract specific types of target artifacts 30-T and/or target data 46-T of target artifacts 30-T. For example, a post-processing plugin 40 may be configured to extract CPU metrics, memory metrics, or the like, and generate a metric output. As another example, a first post-processing plugin 40 may extract build log lines from artifacts 30 containing the word "error". A second post-processing plugin 40 may extract timestamps for the artifacts 30 that contain the word "error" and produce an event timeline.

In another example, a post-processing plugin 40 includes a Prometheus extractor. Prometheus is a software application used for event monitoring and alerting, which records real-time metrics in a time series database. The Prometheus database may be compressed in a .tar or .tar.gz format. Accordingly, the post-processing plugin 40 could extract compressed databases, start a Prometheus instance, and query the Prometheus database for metrics, such as CPU usage metrics. In certain implementations, the post-processing plugin 40 would be able to automatically discover new metric types to extract from a Prometheus database.

In another example, a post-processing plugin 40 includes a JSON extractor. JSON files typically contain structured data which varies depending on data type. Accordingly, there can be large variability in the content and format of the structured data within JSON files. The post-processing plugin 40 can traverse the JSON file and identify events based on field names, such as "timestamp," "name," "id," "start," "stop," or the like. The post-processing plugin 40 can then generate a timeline for these discovered events.

The post-processing plugins 40 generate standardized datasets 48 by extracting target data 46-T and/or converting the target artifacts 30-T to a structured format. These standardized datasets 48 are stored in a post-processing artifact storage 50. Further, the job index 34 may be updated to include the extracted target data 46-T and/or refer to where the relevant target data 46-T and/or standardized datasets 48 related to the failed CI job 26-F are stored.

A user computing device 12-U may then request access to the job index 34 and/or the post-processing artifact storage 50 to troubleshoot the failed CI job 26-F. The computing system 10 presents on a display device 52 of a user computing device 12-U user interface imagery 54 that identifies at least one standardized dataset 48. In certain implementations, the user interface imagery 54 includes a graph illustrating at least one of CPU (computer processing unit) metrics or memory metrics collected during the failed CI job 26-F. Thus, the user can quickly pick out distinguishing features in the standardized dataset 48 related to the failed CI job 26-F, such as CPU or memory spikes at certain unexpected times in a graph.

Figure 1B:
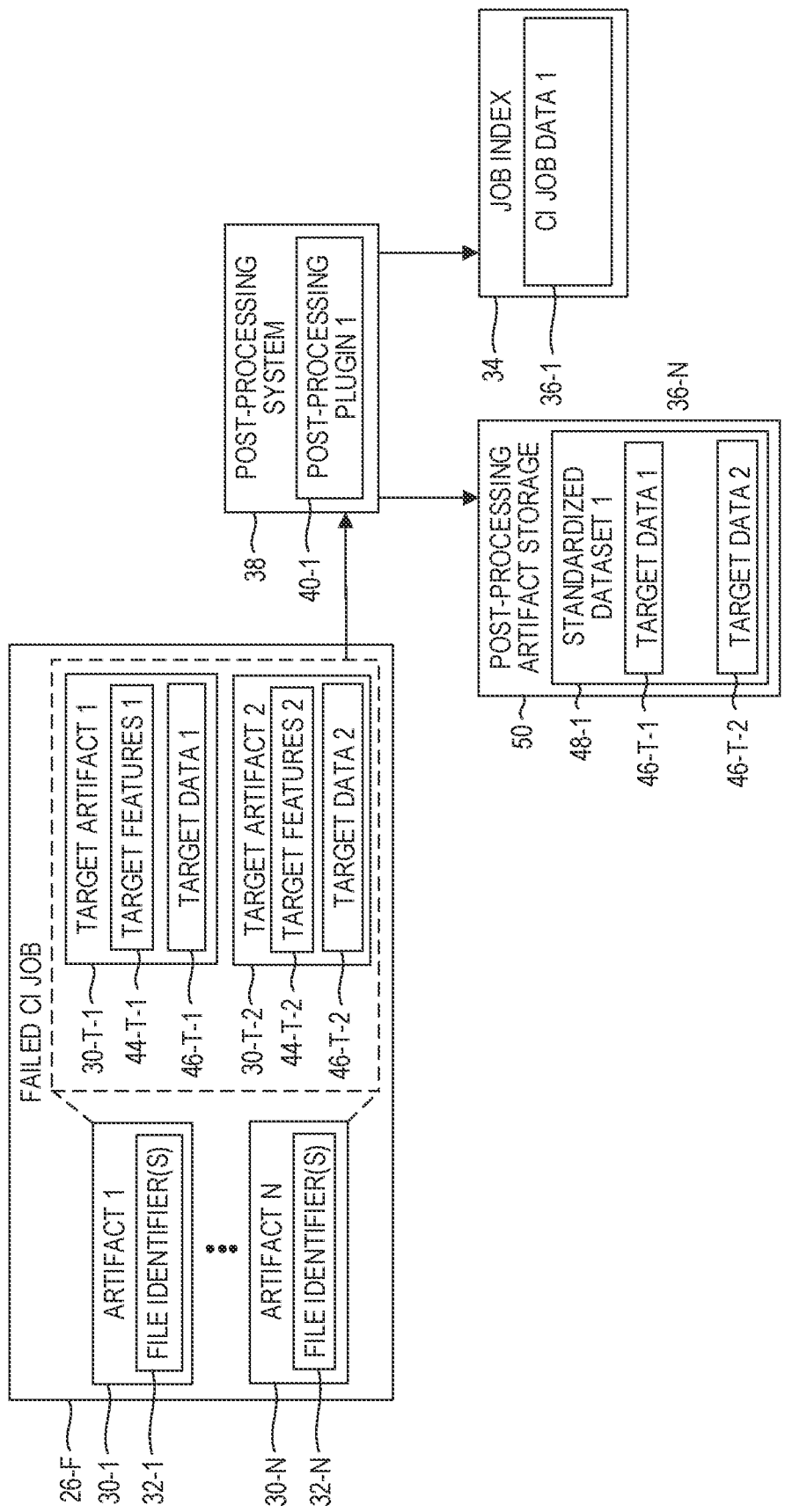
FIG. 1B is a block diagram of the computing system of FIG. 1A illustrating identifying and processing target artifacts and generating a standardized dataset according to one example.

FIG. 1B is a block diagram of the computing system of FIG. 1A illustrating identifying and processing target artifacts and generating a standardized dataset according to one example. The post processing plugin 40-1 of the post-processing system 38 analyzes the artifacts 30 generated by a failed CI job 26-F for target features 44-T to identify target artifacts 30-T. The postprocessing plugin 40-1 then extracts the target data 46-T from the target artifacts 30-T and generates a standardized dataset 48-1 including target data 46-T-1 from a first target artifact 30-T-1 and target data 46-T-2 from a second target artifact 30-T-2. Accordingly, even if the first target artifact 30-T-1 is in a first format and the second target artifact 30-T-2 is in a second format, the post-processing system 38 takes the target data 46-T from various formats and consolidates the target data 46-T into one standardized format.

The post-processing system 38 stores metadata, target data 46-T, and/or metadata corresponding to the standardized dataset 48-1 as CI job data 36-1 in the job index 34. This way, a user can review the target data 46-T easily, but still have access to the standardized dataset 48-1 and the original artifacts 30 corresponding to the failed CI job 26-F.

Figure 1C:
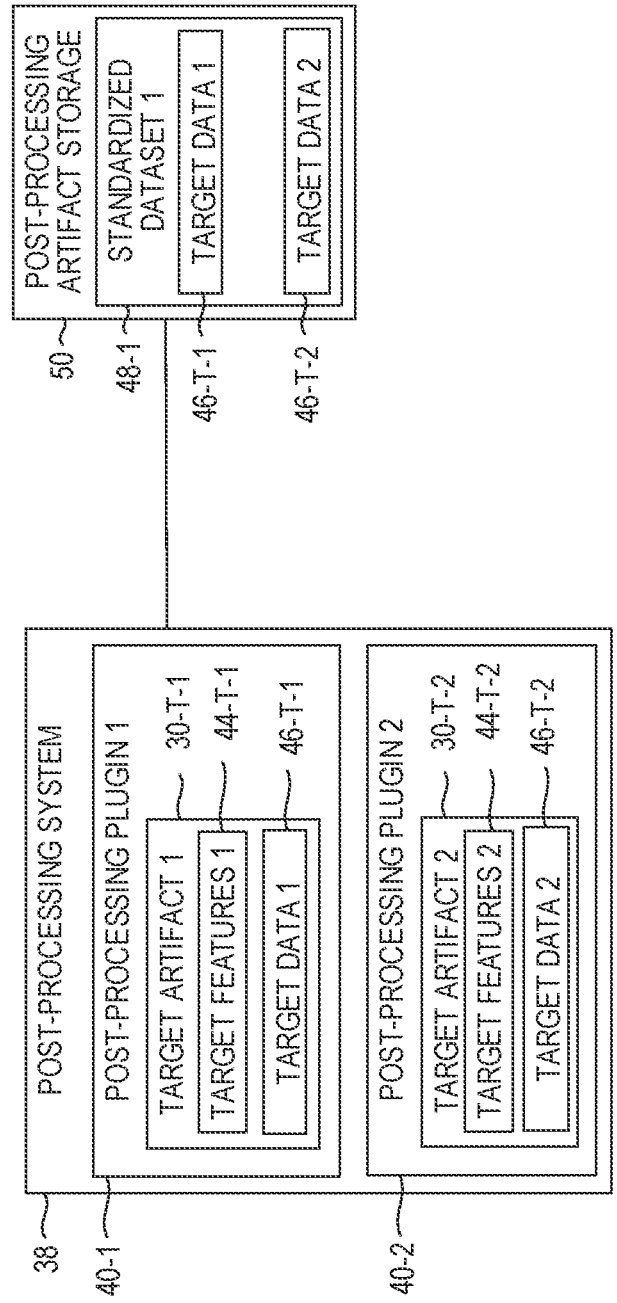
FIG. 1C is a block diagram of the computing system of FIG. 1A illustrating multiple post-processing plugins generating a standardized dataset of target data from target artifacts.

FIG. 1C is a block diagram of the computing system of FIG. 1A illustrating multiple post-processing plugins generating a standardized dataset of target data from target artifacts. The post-processing system 38 includes a first post-processing plugin 40-1 processing a first target artifact 30-T-1 to extract first target data 46-T-1, and second post-processing plugin 40-2 processing a second target artifact 30-T-2 to extract second target data 46-T-2. The post-processing system 38 may identify a first set of target artifacts 30-T-1 (i.e., a first set of a plurality of artifacts 30) in a first format, and a second set of target artifacts 30-T-2 (i.e., a second set of the plurality of artifacts 30) in a second format. The post-processing system 38 then extracts a first set of the predetermined target data 46-T-1 from the first set of target artifacts 30-T-1 in the first format, and extracts a second set of the predetermined target data 46-T-2 from the second set of target artifacts 30-T-2 in the second format. The post-processing system 38 then processes the first set of the predetermined target data 46-T-1 and the second set of the predetermined target data 46-T-2 to generate a standardized dataset 48-1 in the structured format. Thus, the post-processing system 38 can extract different datasets from different formats and generate a single standardized dataset 48-1. Further, multiple plugins 40-1, 40-2 may be used to consolidate target data 46-T-1, 46-T-2 into a single standardized dataset 48-1.

Figure 1D:
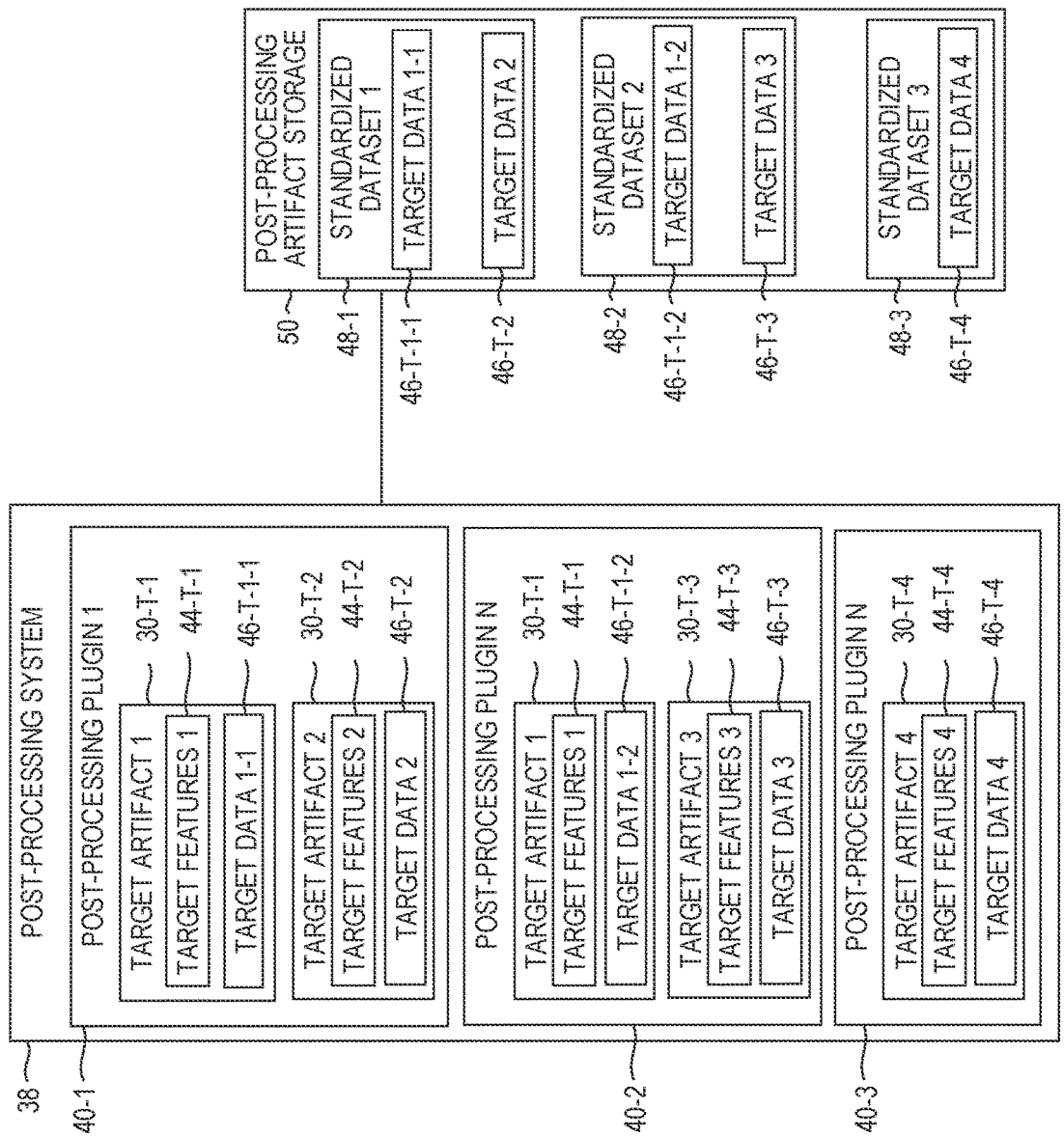
FIG. 1D is a block diagram of the computing system of FIG. 1A illustrating generating different types of standardized datasets.

FIG. 1D is a block diagram of the computing system of FIG. 1A illustrating generating different types of standardized datasets. In this example, a first post-processing plugin 40-1 processes a first and second target artifact 30-T-1, 30-T-2 to extract target data 46-T-1-1, 46-T-2 and generate standardized dataset 48-1 in a first structured format. A second post-processing plugin 40-2 processes the first target artifact 30-T-1 and a third target artifact 30-T-3 to extract target data 46-T-1-2, 46-T-3 and generate standardized dataset 48-2 in a second structured format. Accordingly, different plugins 40-1, 40-2 may process the same target artifact 30-T-1 for different target data 46-T-1-1, 46-T-1-2. A third post-processing plugin 40-3 processes a fourth target artifact 30-T-4 to extract target data 46-T-4 and generate standardized dataset 48-3 in a third structured format. Accordingly, the post-processing system 38 can generate different standardized datasets 48-1, 48-2, 48-3 for different types of target data 46-T.

For example, the first standardized dataset 48-1 may include time-series data associating one or more timestamps with data points from raw data corresponding to the failed CI job. Time-series data pairs several datapoints with timestamps. For example, time-series data could include CPU usage percentage, memory usage percentage, containers running, or the like, at various moments in time.

The second standardized dataset 48-2 may include event data associating one or more timestamps with an event type. Event data includes data of a type coupled with a timestamp. For example, the post-processing system 38 extracts build log lines of the CI job 26 that contain a predetermined character set. The post-processing system 38 then processes the build log lines to generate event data associating one or more timestamps with an event type that includes the predetermined character set. As another example, one event may be to find the word "error" in the log files and the various moments in time at which those error events occurred.

The third standardized dataset 48-3 may include feature detection data identifying a presence or absence of predetermined features. For example, feature detection data includes a list of features that either exist or do not exist in the CI job 26.

Figure 1E:
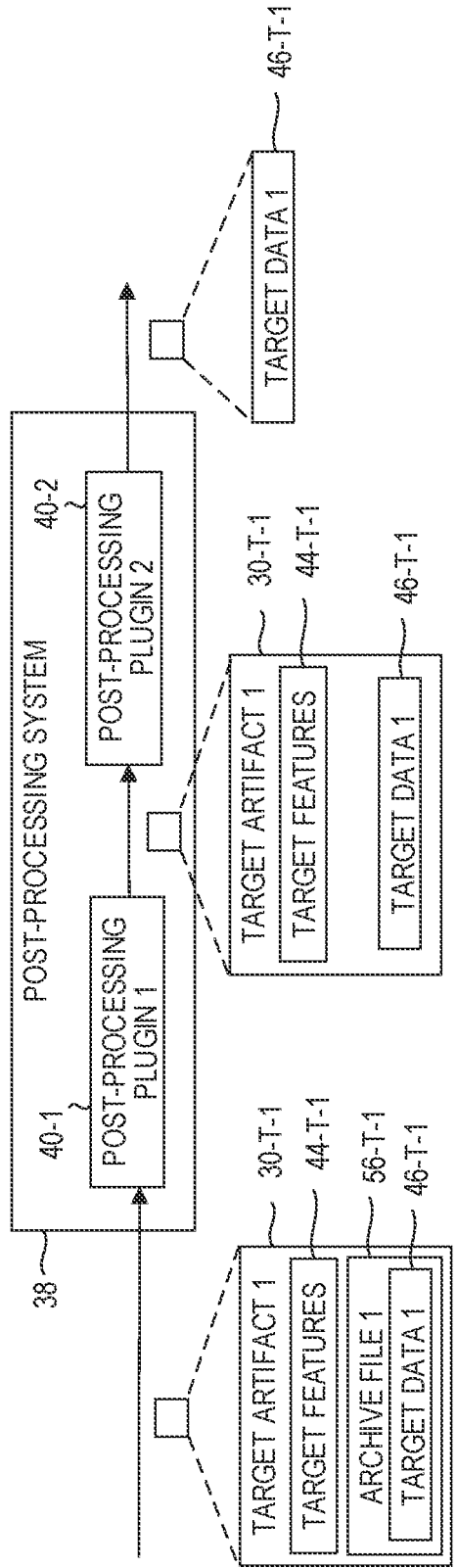
FIG. 1E is a block diagram of the computing system of FIG. 1A illustrating chaining post-processing plugins to access archived data.

FIG. 1E is a block diagram of the computing system of FIG. 1A illustrating chaining post-processing plugins to access archived data. The post-processing plugin 40-1 may extract compressed target data 46-T-1 from an archive file 56-T-1 of the target artifact 30-T-1. The same or a different post-processing plugin 40-2 may be used to extract predetermined target data 46-T-1 from the compressed target data 46-T-1. Accordingly, post-processing plugins 40 may be chained together such that output from a first post-processing plugin 40-1 provides the input to a second post-processing plugin 40-2. For example, a first post-processing plugin 40-1 can extract archive files, such as .tar, .tar.gz, .zip, or the like, to access the compressed target data 46-T-1. The uncompressed target data 46-T-1 of the first post-processing plugin 40-1 may then be provided as input to a second post-processing plugin 40-2, which then extracts the target data 46-T-1 from the target artifact 30-T-1. Although only two levels of extraction are shown, the compressed data may be nested, and accordingly one or more post-processing plugins 40 may be chained together to extract the target data 46-T-1.

Figure 2:
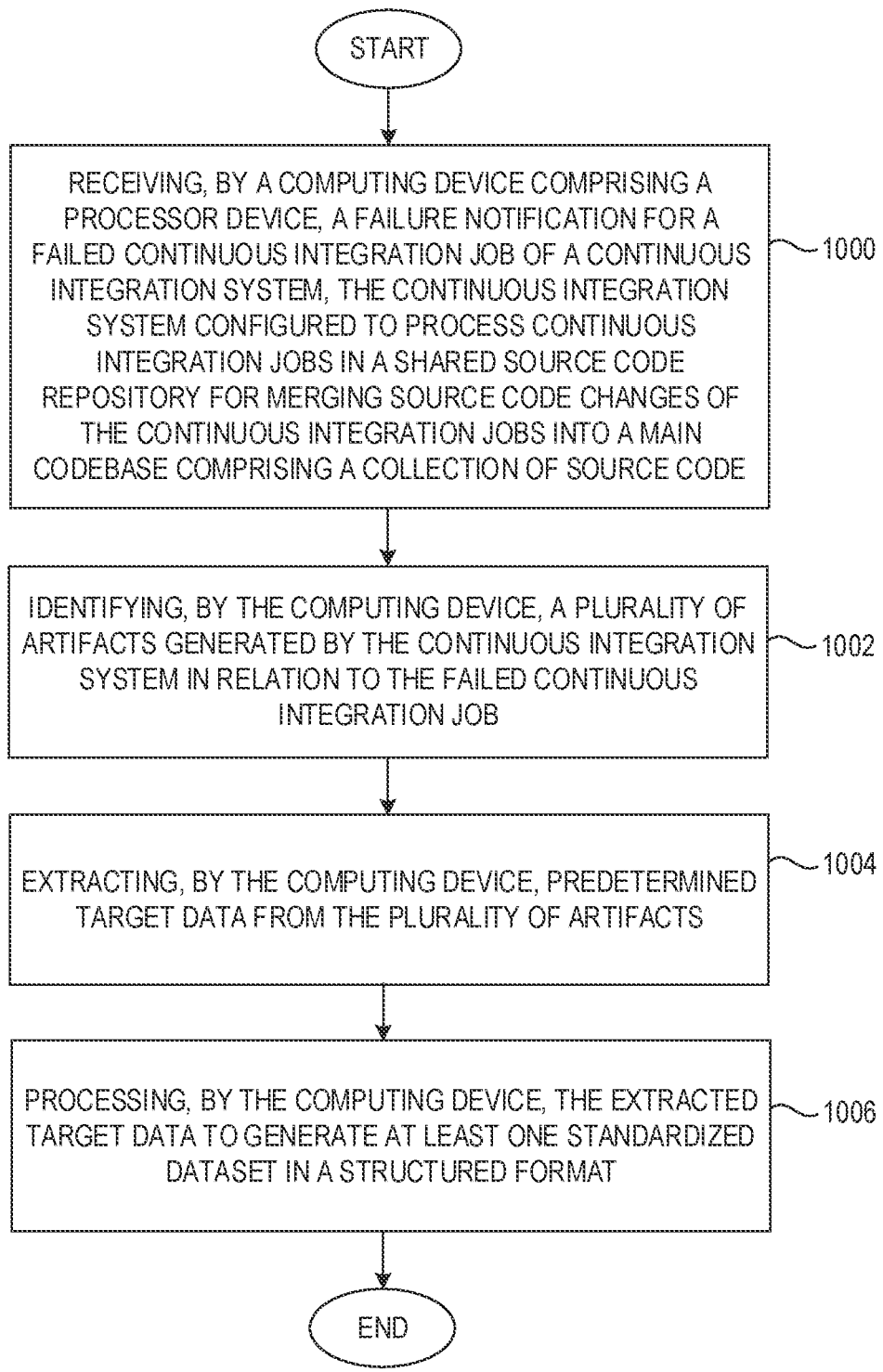
FIG. 2 is a flowchart of a method for processing CI failures according to one example.

FIG. 2 is a flowchart of a method for processing a CI failure according to one example. FIG. 2 will be discussed in conjunction with FIGS. 1A-1E. The method includes identifying, by a computing device 12 comprising a processor device 14, a failed CI job 26-F of a CI system 18, such as by receiving the failure notification 28 or monitoring the job index 34 (1000). The CI system 18 is configured to process CI jobs 26 in a shared source code repository 24 for merging of source code changes of the CI jobs 26 into a main codebase 20 comprising a collection of source code 22. The method further includes identifying, by the computing device 12, a plurality of artifacts 30 generated by the CI system 18 in relation to the failed CI job 26-F (1002). The method further includes extracting, by the computing device 12, predetermined target data 46-T from the plurality of artifacts 30 (1004). The method further includes processing, by the computing device 12, the extracted target data 46-T to generate at least one standardized dataset 48 in a structured format (1006).

Figure 3:
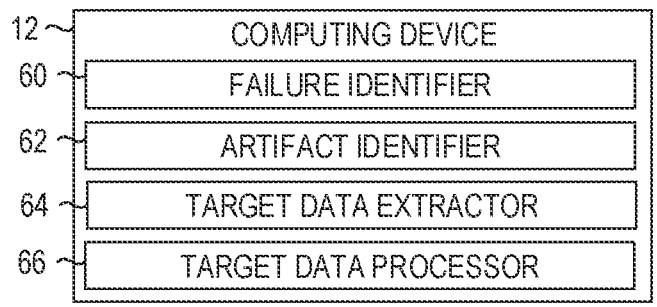
FIG. 3 is a block diagram of a computing device suitable for implementing aspects illustrated in FIGS. 1A-1E according to one example.

FIG. 3 is a block diagram of a computing device according to another implementation. The computing device 12 implements identical functionality as that described above. The computing device 12 includes a failure identifier 60 to identify a failed CI job 26-F of a CI system 18, such as by receiving a failure notification 28 or monitoring the job index 34. The CI system 18 is configured to process CI jobs 26 in a shared source code repository 24 for merging of source code changes of the CI jobs 26 into a main codebase 20 comprising a collection of source code 22. The failure identifier 60 may comprise executable software instructions configured to program a processor device to implement the functionality of identifying a failed CI job 26-F of a CI system 18, may comprise circuitry including, by way of non-limiting example, an application-specific integrated circuit (ASIC), field-programmable gate array (FPGA), or may comprise a combination of executable software instructions and circuitry.

The computing device 12 further includes an artifact identifier 62 to identify a plurality of artifacts 30 generated by the CI system in relation to the failed CI job 26-F. The artifact identifier 62 may comprise executable software instructions configured to program a processor device to implement the functionality of, based on information contained in the request, identifying the subset of computing devices from the set of computing devices, may comprise circuitry including, by way of non-limiting example, an ASIC, FPGA, or may comprise a combination of executable software instructions and circuitry.

The computing device 12 further includes a target data extractor 64 to extract predetermined target data 46-T from the plurality of artifacts 30. The target data extractor 64 may comprise executable software instructions configured to program a processor device to implement the functionality of, based on information contained in the request, identifying the subset of computing devices from the set of computing devices, may comprise circuitry including, by way of non-limiting example, an ASIC, FPGA, or may comprise a combination of executable software instructions and circuitry.

The computing device 12 further includes a target data processor 66 to process the extracted target data 46-T to generate at least one standardized dataset 48 in a structured format. The target data processor 66 may comprise executable software instructions configured to program a processor device to implement the functionality of, based on information contained in the request, identifying the subset of computing devices from the set of computing devices, may comprise circuitry including, by way of non-limiting example, an ASIC, FPGA, or may comprise a combination of executable software instructions and circuitry.

Figure 4:
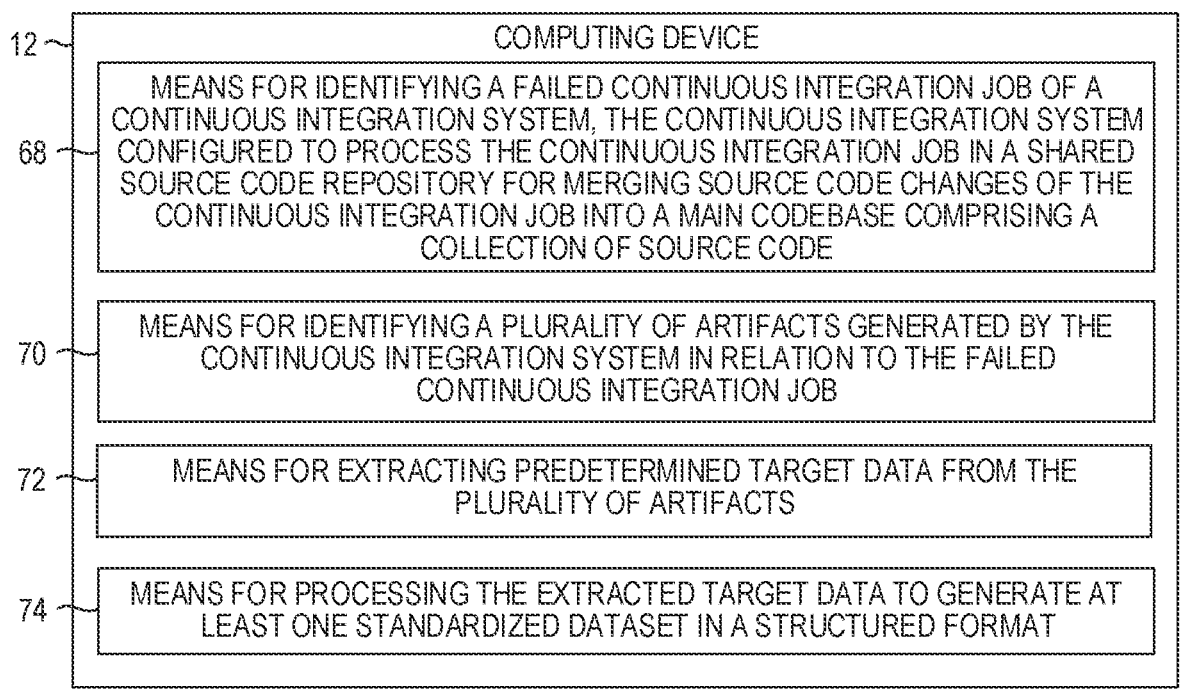
FIG. 4 is a block diagram of a computing device suitable for implementing aspects illustrated in FIGS. 1A-1E according to another example.

FIG. 4 is a block diagram of a computing device according to additional implementations. The computing device 12 implements identical functionality as that described above. In this implementation, the computing device 12 includes a means 68 for identifying a failed CI job 26-F of a CI system 18. The CI system 18 is configured to process CI jobs 26 in a shared source code repository 24 for merging of source code changes of the CI jobs 26 into a main codebase 20 comprising a collection of source code 22. The means 68 may be implemented in any number of manners, including, for example, via the failure identifier 60 illustrated in FIG. 3.

The computing device 12 further includes a means 70 for identifying a plurality of artifacts 30 generated by the CI system 18 in relation to the failed CI job 26-F. The means 70 may be implemented in any number of manners, including, for example, via the artifact identifier 62 illustrated in FIG. 3.

The computing device 12 further includes a means 72 for extracting predetermined target data 46-T from the plurality of artifacts 30. The means 72 may be implemented in any number of manners, including, for example, via the target data extractor 64 illustrated in FIG. 3.

The computing device 12 further includes means 74 for processing the extracted target data to generate at least one standardized dataset in a structured format. The means 74 may be implemented in any number of manners, including, for example, via the target data processor 66 illustrated in FIG. 3.

Figure 5A:
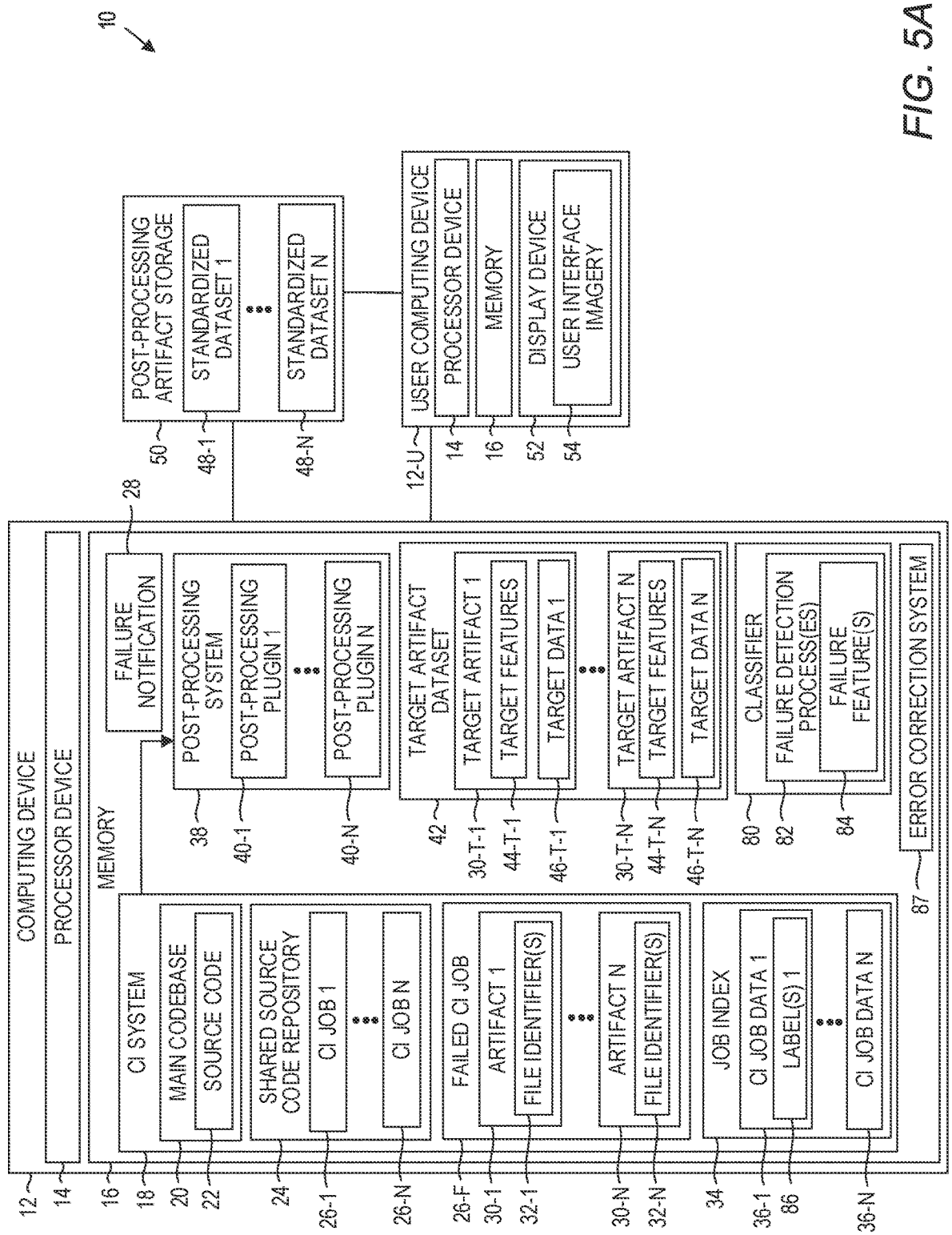
FIG. 5A is a block diagram of a computing system to process CI failures to classify the CI failures according to one example.

FIG. 5A is a block diagram of a computing system to process CI failures to classify the CI failures according to one example. The computing device 12 includes a classifier 80. Because the classifier 80 is a component of the computing device 12, functionality implemented by the classifier 80 may be attributed to the computing device 12 generally. Moreover, in examples where the classifier 80 comprises software instructions that program the processor device 14 to carry out functionality discussed herein, functionality implemented by the classifier 80 may be attributed herein to the processor device 14.

As similarly noted above, the computing device 12 identifies a failed CI job 26-F of a CI system 18. The classifier 80 accesses at least one standardized dataset 48 in a structured format. In certain implementations, the post-processing system 38 automatically sends a notification to the classifier 80 regarding the failed CI job 26-F and the standardized datasets 48 related to the failed CI job 26-F. The at least one standardized dataset 48 includes extracted target data 46-T from a plurality of artifacts 30 generated by the CI system 18 in relation to the CI job 26. In some examples, the classifier 80 comprises a machine-learned model that is trained using CI historical data and/or CI corpus, as explained in more detail below. The CI corpus is a language resource of large and structured sets of texts in a single or multiple computer languages. In particular, the CI corpus may be used to train Natural Language processes of the classifier 80, among other processes, to detect certain events in target artifacts 30-T. The CI historical data includes previous successful and unsuccessful CI jobs 26.

The classifier 80 applies at least one failure detection process 82-1, 82-N (referred to generally as failure detection process 82) to the at least one standardized dataset 48 to determine at least one failure feature 84 of the at least one standardized dataset 48. The classifier 80 stores a label 86-1-86-N (referred to generally as label 86) associated with the at least one standardized dataset 48 corresponding to the at least one failure feature 84 of the at least one standardized dataset 48. In particular, the label 86 is stored in the job index 34 with the corresponding CI job data 36. The label 86 corresponds to the failure feature 84 directed to certain types of failures. For example, some labels 86 include DNS failure, inactivity, test failure, build failure, quality checking error, unsigned, unreachable, or the like.

Such labels 86 facilitate a user easily navigating through the CI job data 36 and/or the standardized datasets 48 to troubleshoot a failed CI job 26-F. In particular, the labels 86 are displayed to a user to facilitate root cause analysis.

In certain implementations, an error correction system 87 is configured to initiate a corrective action 96 based on the determined failure classification and the corresponding label 86 applied, as discussed in more detail below.

Figure 5B:
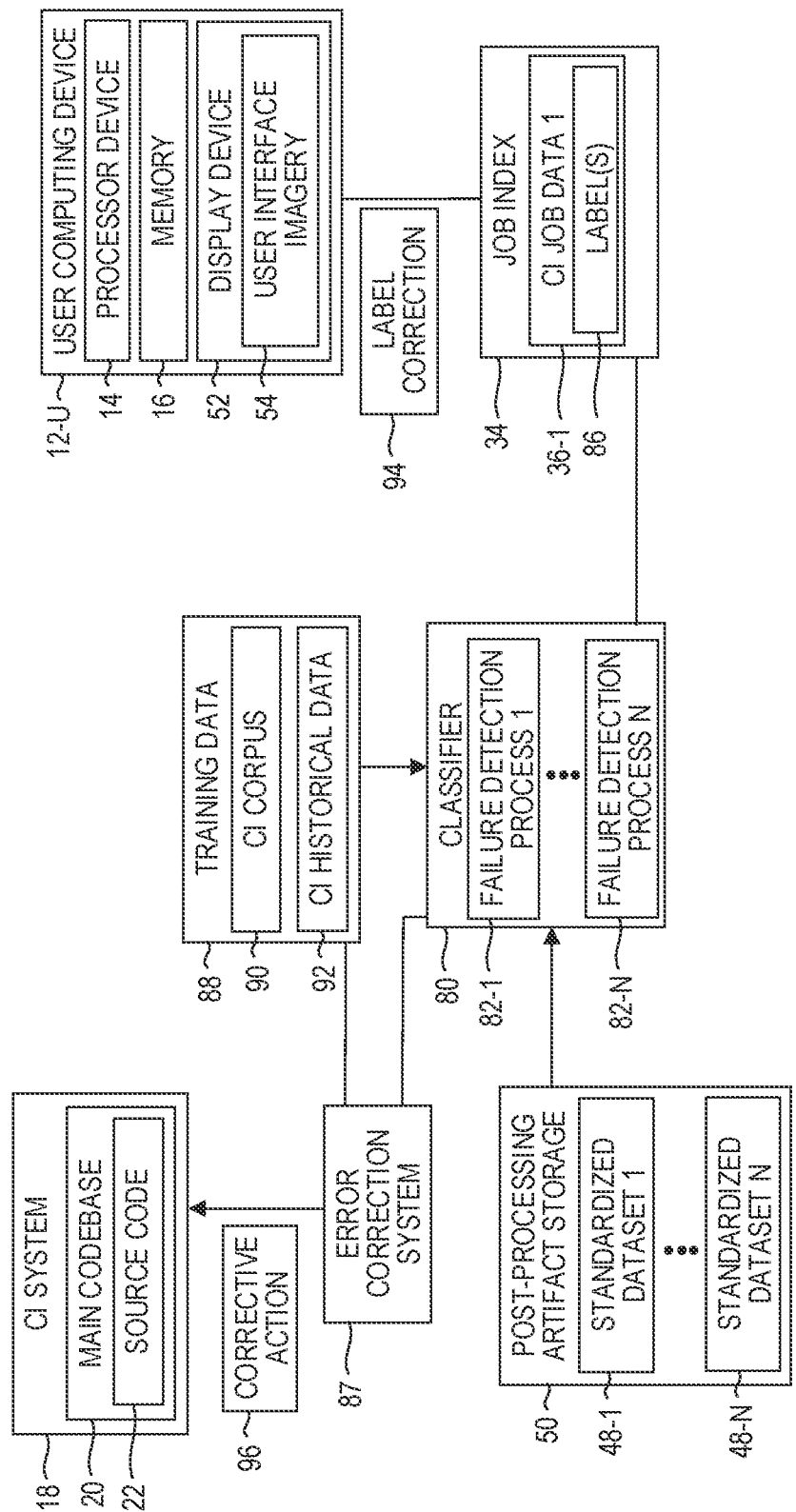
FIG. 5B is a block diagram of the computing system of FIG. 5A illustrating processing CI failures to classify the CI failures and store a corresponding label in a job index according to one example.

FIG. 5B is a block diagram of the computing system of FIG. 5A illustrating processing CI failure to classify the CI failures and storing a corresponding label in a job index according to one example. As noted above, in certain implementations, the classifier 80 is trained from training data 88 including a CI corpus 90 and CI historical data 92. The CI corpus 90 is a language resource of large and structured sets of texts in a single or multiple computer languages. The CI corpus 90 may be used to train Natural Language processes to detect certain events in target artifacts 30-T. The CI historical data 92 includes previous successful and unsuccessful CI jobs 26.

As noted above, the classifier 80 receives a notification from the post-processing system 38 of the failed CI job 26-F and accesses the standardized datasets 48 from the post-processing artifact storage 50. In certain implementations, the classifier 80 monitors the job index 34 to see when the post-processing system 38 has processed a failed CI job 26-F.

The classifier 80 processes the standardized datasets 48 using failure detection processes 82 to store the labels 86 related to the failed CI job 26-F in the job index 34. A user accessing the job index 34 may review the labels 86 and determine that one or more of the labels 86 is incorrect. The user may then transmit a label correction 94 to the job index 34, which then provides feedback to the classifier 80. The classifier 80 may then modify one or more failure detection processes 82 based on the label correction 94.

In certain implementations, the error correction system 87 is configured to initiate a corrective action 96 based on the determined failure classification and the corresponding label 86 applied. In particular, the error correction system 87 determines a corrective action 96 based on at least one of a CI corpus 90 and/or historical data 92 that includes a same or similar failure feature 84, and then initiates CI system 18 to execute the CI job 26 with the corrective action 96. For example, the error correction system 87 may determine a corrective action 96 based on similar fixes in the CI corpus 90 and/or CI historical data 92, such as pull requests that include similar error wording. The generated corrective action 96 may be a pull request with a modification to the failed CI job 26-F. The CI system 18 may then run the failed CI job 26-F with the corrective action 96 and start a new build. As another example, the error correction system 87 may determine that the corrective action 96 requires manual input and review, and automatically send a notification to a user, such as in the case of a downed network or unreachable endpoint. As yet another example, the error correction system 87 may determine that the corrective action 96 is simply to run the failed CI job 26-F again without any modification, such as in the case of a transient problem. For example, transient problems may include a DNS server error. The error correction system 87 may also be configured that after a predetermined number of retries, the error correction system 87 sends a notification to the user requesting manual input and review. The error correction system 87 may be notified as to the success or failure or rerunning the failed CI job 26-F to provide positive or negative reinforcement.

Figure 5C:
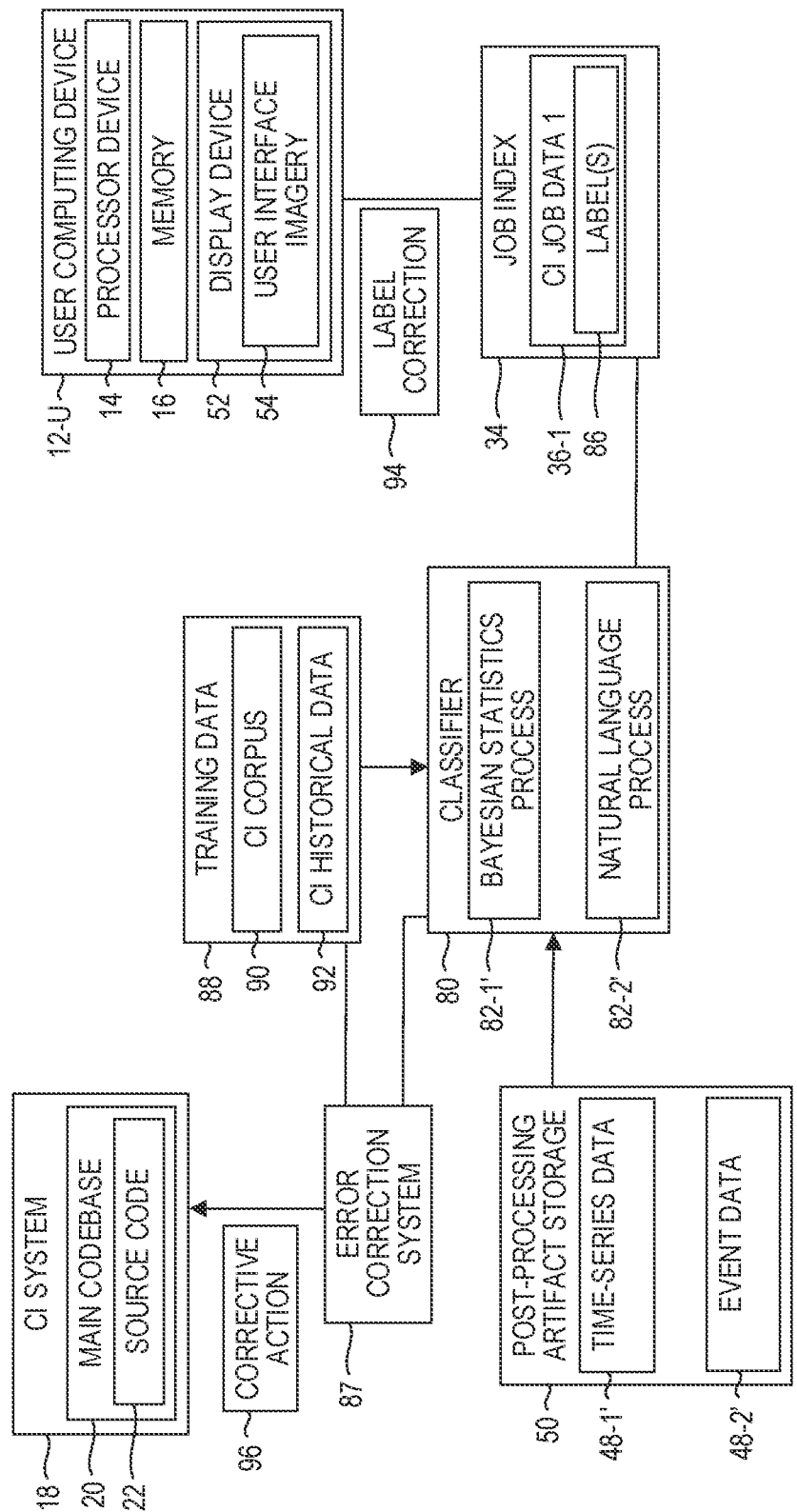
FIG. 5C is a block diagram of the computing system of FIG. 5A illustrating processing time-series data and event data using a Bayesian statistics process and a Natural Language process.

FIG. 5C is a block diagram of the computing system of FIG. 5A illustrating processing time-series data and event data using a Bayesian statistics process and a Natural Language process. In certain implementations, the post-processing artifact storage 50 includes time-series data 48-1' (or other metrics data) and event data 48-2'. The classifier 80 accesses time-series data 48-1' associating one or more timestamps with data points from raw data corresponding to the CI job 26. The classifier 80 applies a Bayesian statistics process 82-1' to the time-series data 48-1' to determine a failure feature 84 (see FIG. 5A) of the time-series data 48-1'. The failure feature 84 may include inactivity due to at least one of CPU (computer processing unit) usage below a predetermined threshold and/or memory usage below a predetermined threshold.

The classifier 80 may access the event data 48-2' associating one or more timestamps with an event type. The classifier 80 applies a Natural Language process 82-2' to the event data 48-2' to determine a failure feature 84 of the event data 48-2', such as by detecting predetermined words in the event data. For example, the Natural Language process 82-2' may identify nouns, verbs, or adjectives. Nouns may include "build," "connection," "error," "network," "package," "storage," "threshold." Verbs may include "disconnect," "exceed," "fail," "find" (including declinations and negations). Adjectives may include "signed," "unreachable," "unsigned." The Natural Language process 82-2' may determine the failure feature 84 depending on the words identified. For example, the Natural Language process 82-2' may determine a DNS (Domain Name System) failure.

In certain implementations, the labels 86 are based on a correlation between an output of the Bayesian statistics process 82-1' and an output of the Natural Language process 82-2'. For example, the labels 86 may depend on a correlation between metrics data and event type frequency or existence, such as if a network is unreachable when network interface throughput is low.

In one comprehensive example, a user changes code in a software project and submits a CI job 26 as a pull request, which triggers the CI system 18 to automatically test the CI job 26. The CI job 26 subsequently fails, producing several artifacts 30 including a compiled binary, a build log, and a Prometheus data dump containing CPU and memory metrics collected during the run of the CI job 26. The post-processing system 38 runs post-processing plugins 40 on the artifacts 30. A first post-processing plugin 40-1 extracts build log lines with the word "error," thereby generating event data 48-2'. A second post-processing plugin 40-2 extracts timestamps from an output of the first post-processing plugin 40-1 and produces an event timeline as time-series data 48-1'. A third post-processing plugin 40-3 extracts CPU and memory metrics, also producing time-series data 48-1'. The classifier 80 uses a Natural Language process 82-2' to extract nouns related to a DNS failure from the event data 48-2'. The Natural Language process 82-2' stores a label 86 of a DNS failure corresponding to the failed CI job 26-F, such as in the job index 34. The classifier 80 uses a Bayesian statistics process 82-1' to extract generally low CPU and memory usage from the time-series data 48-1' and stores a label 86 of inactivity corresponding to the failed CI job 26-F, such as in the job index 34.

The error correction system 87 recognizes labels 86 as a failure that should be retried and triggers a retry of the failed CI job 26-F in the CI system 18. The failed CI job 26-F is run again and passes, thereby providing an automatic fix without any human intervention.

Figure 6:
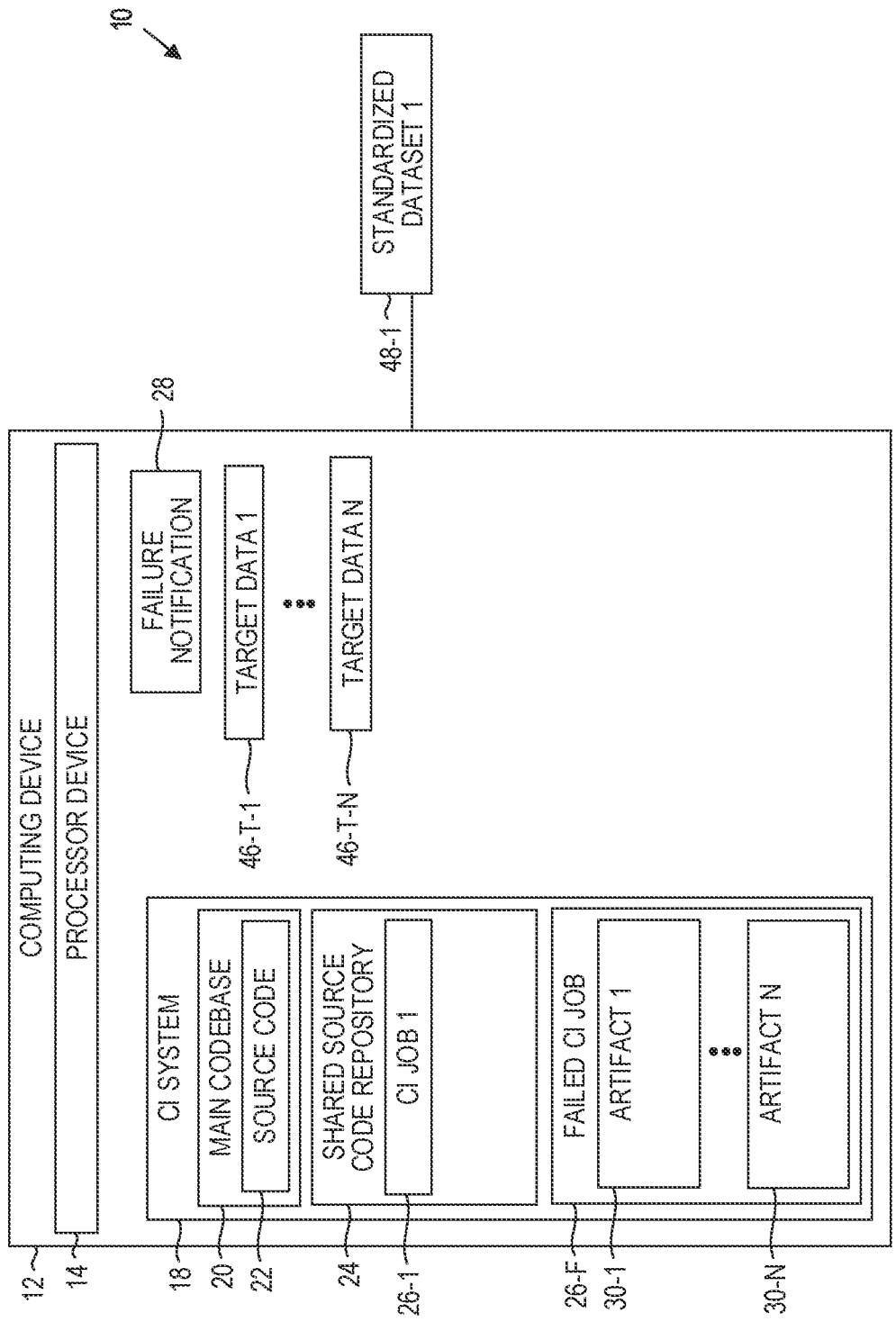
FIG. 6 is a simplified block diagram of the environment illustrated in FIGS. 1A-1E according to one implementation.

FIG. 6 is a simplified block diagram of the computing system 10 illustrated in FIGS. 1A-1E according to one implementation. In this example, a computing device 12 comprising a processor device 14 identifies a failed CI job 26-F of a CI system 18. The CI system 18 is configured to process CI jobs 26 in a shared source code repository 24 for merging source code changes of the CI jobs 26 into a main codebase 20 comprising a collection of source code 22. The computing device 12 further identifies a plurality of artifacts 30 generated by the CI system 18 in relation to the failed CI job 26-F. The computing device 12 further extracts predetermined target data 46-T from the plurality of artifacts 30. The computing device 12 further processes the extracted target data 46-T to generate at least one standardized dataset 48 in a structured format.

Figure 7:
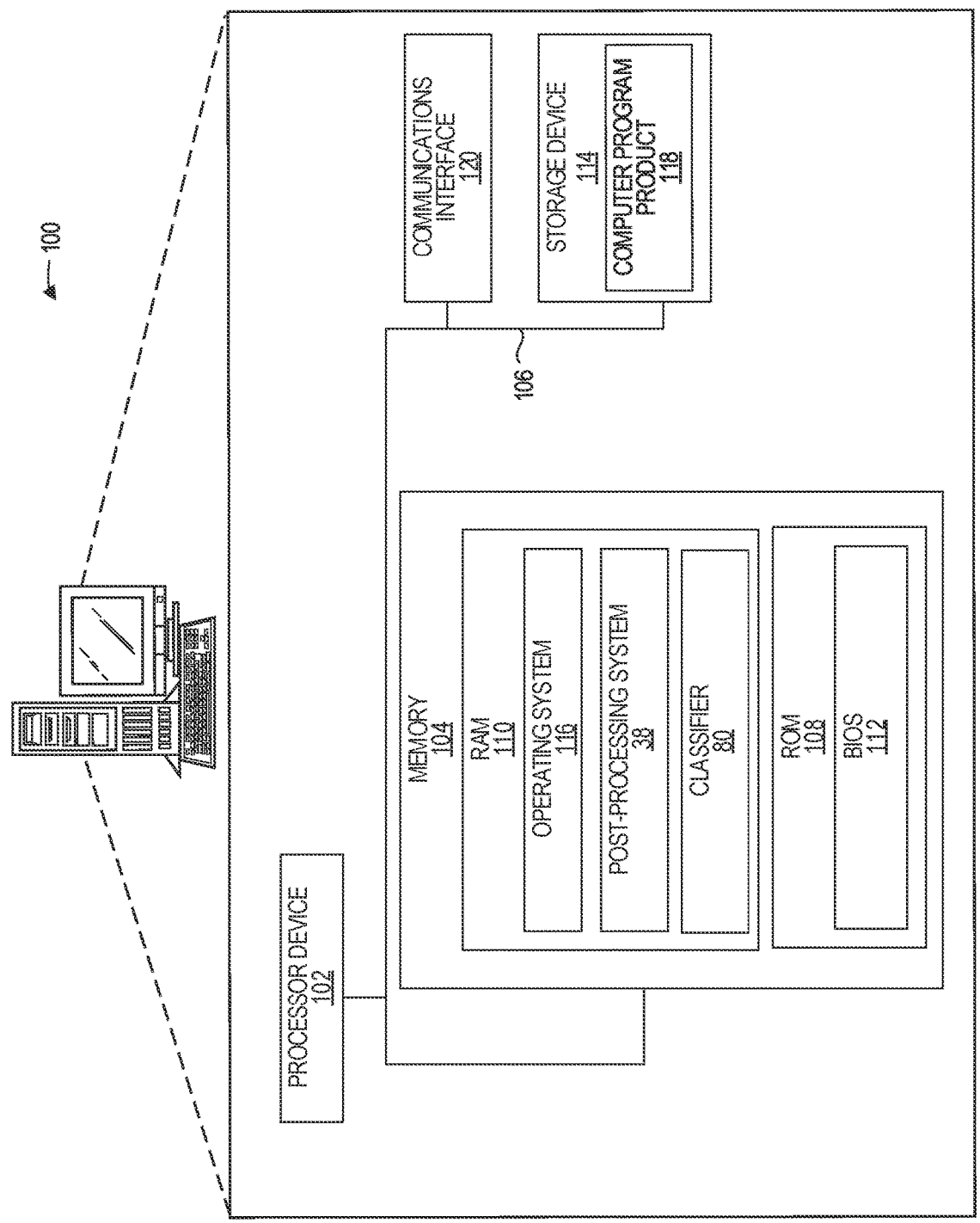
FIG. 7 is a block diagram of a computing device suitable for implementing examples disclosed herein according to one implementation.

FIG. 7 is a block diagram of a computing device 100 containing components suitable for implementing any of the processing devices disclosed herein. The computing device 100 includes a processor device 102, a system memory 104, and a system bus 106. The system bus 106 provides an interface for system components including, but not limited to, the system memory 104 and the processor device 102. The processor device 102 can be any commercially available or proprietary processor.

The system bus 106 may be any of several types of bus structures that may further interconnect to a memory bus (with or without a memory controller), a peripheral bus, and/or a local bus using any of a variety of commercially available bus architectures. The system memory 104 may include non-volatile memory 108 (e.g., read-only memory (ROM), erasable programmable read-only memory (EPROM), electrically erasable programmable read-only memory (EEPROM), and the like), and volatile memory 110 (e.g., random-access memory (RAM)). A basic input/output system (BIOS) 112 may be stored in the non-volatile memory 108 and can include the basic routines that help transfer information between elements within the computing device 100. The volatile memory 110 may also include a high-speed RAM, such as static RAM, for caching data.

The computing device 100 may further include or be coupled to a non-transitory computer-readable storage medium such as storage device 114, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 114 and other drives associated with computer-readable media and computer-usable media may provide non-volatile storage of data, data structures, computer-executable instructions, and the like.

A number of modules can be stored in the storage device 114 and in the volatile memory 110, including an operating system 116 and one or more program modules, which may implement the functionality described herein in whole or in part. All or a portion of the examples herein may be implemented as a computer program product 118 stored on a transitory or non-transitory computer-usable or computer-readable storage medium, such as the storage device 114, which includes complex programming instructions, such as complex computer-readable program code, to cause the processor device 102 to carry out the steps described herein. Thus, the computer-readable program code can comprise software instructions for implementing the functionality of the examples described herein when executed on the processor device 102. The processor device 102, in conjunction with the network manager in the volatile memory 110, may serve as a controller or control system for the computing device 100 that is to implement the functionality described herein.

The computing device 100 may also include one or more communication interfaces 120, depending on the particular functionality of the computing device 100. The communication interfaces 120 may comprise one or more wired Ethernet transceivers, wireless transceivers, fiber, satellite, and/or coaxial interfaces by way of non-limiting examples.

Other computer system designs and configurations may also be suitable to implement the systems and methods described herein. The following examples illustrate various implementations in accordance with one or more aspects of the disclosure.

Example 1 is a method comprising identifying, by a computing device comprising a processor device, a failed continuous integration job of a continuous integration system, the continuous integration system to process continuous integration jobs in a shared source code repository for merging source code changes of the continuous integration jobs into a main codebase comprising a collection of source code; accessing, by the computing device, at least one standardized dataset in a structured format, the at least one standardized dataset compiled from extracted target data from a plurality of artifacts generated by the continuous integration system in relation to the failed continuous integration job; applying, by the computing device, at least one failure detection process to the at least one standardized dataset to determine at least one failure feature of the at least one standardized dataset; and storing, by the computing device, a label associated with the at least one standardized dataset corresponding to the at least one failure feature of the at least one standardized dataset.

Example 2 is the method of example 1, wherein accessing, by the computing device, the at least one standardized dataset in the structured format, the at least one standardized dataset compiled from the extracted target data from the plurality of artifacts generated by the continuous integration system in relation to the failed continuous integration job further comprises: accessing, by the computing device, the at least one standardized dataset in the structured format, the at least one standardized dataset compiled from the extracted target data from the plurality of artifacts generated by the continuous integration system in relation to the failed continuous integration job, the plurality of artifacts comprising at least one of binary code, log files, JavaScript Objection Notation (JSON) files, time-series databases, or compressed data.

Example 3 is the method of example 1, wherein accessing, by the computing device, the at least one standardized dataset in the structured format, the at least one standardized dataset compiled from the extracted target data from the plurality of artifacts generated by the continuous integration system in relation to the failed continuous integration job further comprises: accessing, by the computing device, the at least one standardized dataset in the structured format, the at least one standardized dataset including time-series data associating one or more timestamps with data points from raw data corresponding to the continuous integration job.

Example 4 is the method of example 3, wherein applying, by the computing device, the at least one failure detection process to the at least one standardized dataset to determine the at least one failure feature of the at least one standardized dataset further comprises: applying a Bayesian statistics process to the time-series data to determine the at least one failure feature of the at least one standardized dataset.

Example 5 is the method of example 1, wherein accessing, by the computing device, the at least one standardized dataset in the structured format, the at least one standardized dataset compiled from the extracted target data from the plurality of artifacts generated by the continuous integration system in relation to the failed continuous integration job further comprises: accessing, by the computing device, the at least one standardized dataset in the structured format, the at least one standardized dataset including event data associating one or more timestamps with an event type.

Example 6 is the method of example 5, wherein applying, by the computing device, the at least one failure detection process to the at least one standardized dataset to determine the at least one failure feature of the at least one standardized dataset further comprises: applying a Natural Language process to the event data to determine the at least one failure feature of the at least one standardized dataset.

Example 7 is the method of example 5, wherein applying a Natural Language process to the event data to determine the at least one failure feature of the at least one standardized dataset further comprises: detecting predetermined words in the event data.

Example 8 is the method of example 1, wherein accessing, by the computing device, the at least one standardized dataset in the structured format, the at least one standardized dataset compiled from the extracted target data from the plurality of artifacts generated by the continuous integration system in relation to the failed continuous integration job further comprises: accessing, by the computing device, the at least one standardized dataset in the structured format, the at least one standardized dataset including: time-series data associating one or more timestamps with data points from raw data corresponding to the continuous integration job; and event data associating one or more timestamps with an event type.

Example 9 is the method of example 8, wherein applying, by the computing device, the at least one failure detection process to the at least one standardized dataset to determine the at least one failure feature of the at least one standardized dataset further comprises: applying a Bayesian statistics process to the time-series data to determine the at least one failure feature of the at least one standardized dataset; and applying a Natural Language process to the event data to determine the at least one failure feature of the at least one standardized dataset.

Example 10 is the method of example 1, further comprising: determining, by the computing device, a corrective action based on at least one of a continuous integration corpus or historical data that includes a same failure feature; and initiating, by the computing device, the continuous integration system to execute the continuous integration job with the corrective action.

Example 11 is the method of example 1, wherein accessing, by the computing device, the at least one standardized dataset in the structured format, the at least one standardized dataset compiled from the extracted target data from the plurality of artifacts generated by the continuous integration system in relation to the failed continuous integration job further comprises: accessing, by the computing device, the at least one standardized dataset in the structured format, the at least one standardized dataset including: time-series data associating one or more timestamps with data points from raw data corresponding to the continuous integration job; and event data associating one or more timestamps with an event type; wherein applying, by the computing device, the at least one failure detection process to the at least one standardized dataset to determine the at least one failure feature of the at least one standardized dataset further comprises: applying a Bayesian statistics process to the time-series data to determine the at least one failure feature of the at least one standardized dataset includes inactivity due to at least one of CPU (computer processing unit) usage below a predetermined threshold and/or memory usage below a predetermined threshold; and applying a Natural Language process to the event data to determine the at least one failure feature of the at least one standardized dataset by identifying nouns related to a DNS (Domain Name System) failure; and further comprising: determining, by the computing device, a corrective action based on at least one of a continuous integration corpus or historical data that includes a DNS failure, the corrective action comprising retrying the continuous integration job; and initiating, by the computing device, the continuous integration system to process the failed continuous integration job based on the corrective action.

Example 12 is the method of example 1, further comprising: identifying, by the computing device, the failed continuous integration job of the continuous integration system failing a second time; and sending, by the computing device, a manual input request to a user.

Example 13 is the method of example 1, further comprising: receiving, by the computing device, a label correction from a user; and revising, by the computing device, the at least one failure detection process based on the label correction.

Example 14 is the method of example 1, further comprising presenting, by a computer system on a display device, user interface imagery of a job index including the label.

Example 15 is the method of example 1, further comprising presenting, by a computer system on a display device, user interface imagery of at least a portion of the standardized dataset.

Example 16 is a system comprising a computing device comprising a processor device to identify a failed continuous integration job of a continuous integration system, the continuous integration system to process continuous integration jobs in a shared source code repository; access at least one standardized dataset in a structured format, the at least one standardized dataset compiled from extracted target data from a plurality of artifacts generated by the continuous integration system in relation to the failed continuous integration job; apply at least one failure detection process to the at least one standardized dataset to determine at least one failure feature of the at least one standardized dataset; and store a label associated with the at least one standardized dataset corresponding to the at least one failure feature of the at least one standardized dataset.

Example 17 is a computer program product stored on a non-transitory computer-readable storage medium and including instructions to cause a processor device to identify a failed continuous integration job of a continuous integration system; access at least one standardized dataset in a structured format, the at least one standardized dataset compiled from extracted target data from a plurality of artifacts generated by the continuous integration system in relation to the failed continuous integration job; apply at least one failure detection process to the at least one standardized dataset to determine at least one failure feature of the at least one standardized dataset; and store a label associated with the at least one standardized dataset corresponding to the at least one failure feature of the at least one standardized dataset.

Example 18 is a computing device that includes a failure identifier to identify a failed continuous integration job of a continuous integration system, the continuous integration system configured to process continuous integration jobs in a shared source code repository for merging source code changes of the continuous integration jobs into a main codebase comprising a collection of source code; an artifact identifier to identify a plurality of artifacts generated by the continuous integration system in relation to the failed continuous integration job; a target data extractor to extract predetermined target data from the plurality of artifacts; and a target data processor to process the extracted target data to generate at least one standardized dataset in a structured format.

Example 19 is a computing device that includes a means for identifying a failed continuous integration job of a continuous integration system. The continuous integration system is configured to process continuous integration jobs in a shared source code repository for merging source code changes of the continuous integration jobs into a main codebase comprising a collection of source code. The computing device further includes a means for identifying a plurality of artifacts generated by the continuous integration system in relation to the failed continuous integration job. The computing device further includes a means for extracting predetermined target data from the plurality of artifacts. The computing device further includes means for processing the extracted target data to generate at least one standardized dataset in a structured format.

Individuals will recognize improvements and modifications to the preferred examples of the disclosure. All such improvements and modifications are considered within the scope of the concepts disclosed herein and the claims that follow.

What is claimed is:

1. A method comprising:
   identifying, by a computing device comprising a processor device, a failed continuous integration job of a continuous integration system, the continuous integration system configured to process continuous integration jobs in a shared source code repository for merging source code changes of the continuous integration jobs into a main codebase comprising a collection of source code;
   identifying, by the computing device, a plurality of artifacts generated by the continuous integration system in relation to the failed continuous integration job;
   extracting, by the computing device, predetermined target data from the plurality of artifacts;
   processing, by the computing device, the extracted target data to generate at least one standardized dataset in a structured format; and
   processing, by the computing device and using a machine-learned classifier model, the at least one standardized dataset to generate a label associated with the failed continuous integration job, wherein the label indicates at least one failure feature;
     wherein the machine-learned classifier model was trained using historical continuous integration data.

2. The method of claim 1, wherein identifying, by the computing device, the plurality of artifacts generated by the continuous integration system in relation to the failed continuous integration job further comprises:
   identifying, by the computing device, the plurality of artifacts generated by the continuous integration system in relation to the failed continuous integration job, at least a portion of the plurality of artifacts being unprocessed.

3. The method of claim 1, wherein identifying, by the computing device, the plurality of artifacts generated by the continuous integration system in relation to the failed continuous integration job further comprises:
   identifying, by the computing device, the plurality of artifacts generated by the continuous integration system in relation to the failed continuous integration job, the plurality of artifacts comprising at least one of binary code, log files, structured data files, time-series databases, or compressed data.

4. The method of claim 1, further comprising:
   detecting target features of the plurality of artifacts; and
   identifying, by the computing device, target artifacts of the plurality of artifacts based on the detected target features.

5. The method of claim 4, wherein detecting the target features of the plurality of artifacts further comprises:
   detecting the target features of the plurality of artifacts, the target features comprising at least one of a file type of the target artifact, a suffix of a file name of the target artifact, a folder location of the target artifact, or a content of the target artifact.

6. The method of claim 1, wherein extracting, by the computing device, the predetermined target data from the plurality of artifacts further comprises:
   extracting, by the computing device, compressed target data from an archive file of the plurality of artifacts; and
   extracting, by the computing device, the predetermined target data from the compressed target data.

7. The method of claim 1,
   wherein identifying, by the computing device, the plurality of artifacts generated by the continuous integration system in relation to the failed continuous integration job further comprises:
     identifying, by the computing device, the plurality of artifacts generated by the continuous integration system in relation to the failed continuous integration job, a first set of the plurality of artifacts in a first format and a second set of the plurality of artifacts in a second format;
   wherein extracting, by the computing device, the predetermined target data from the plurality of artifacts further comprises:
     extracting, by the computing device, a first set of the predetermined target data from the first set of the plurality of artifacts in the first format; and
     extracting, by the computing device, a second set of the predetermined target data from the second set of the plurality of artifacts in the second format; and
   wherein processing, by the computing device, the extracted target data to generate the at least one standardized dataset in the structured format further comprises:
     processing, by the computing device, the first set of the predetermined target data and the second set of the predetermined target data to generate a standardized dataset in the structured format.

8. The method of claim 1, wherein processing, by the computing device, the extracted target data to generate the at least one standardized dataset in the structured format further comprises:
processing, by the computing device, a first dataset of the predetermined target data to generate a first standardized dataset in a first structured format; and
processing, by the computing device, a second dataset of the predetermined target data to generate a second standardized dataset in a second structured format.

9. The method of claim 1, wherein processing, by the computing device, the extracted target data to generate the at least one standardized dataset in the structured format further comprises:
processing, by the computing device, the extracted target data to generate at least one of:
time-series data associating one or more timestamps with data points from raw data corresponding to the failed continuous integration job;
event data associating one or more timestamps with an event type; and
feature detection data identifying a presence or absence of predetermined features.

10. The method of claim 1, wherein processing, by the computing device, the extracted target data to generate the at least one standardized dataset in the structured format further comprises:
processing, by the computing device, the extracted target data to generate:
time-series data associating one or more timestamps with data points from raw data corresponding to the failed continuous integration job;
event data associating one or more timestamps with an event type; and
feature detection data identifying a presence or absence of predetermined features.

11. The method of claim 1,
wherein extracting, by the computing device, the predetermined target data from the plurality of artifacts further comprises:
extracting, by the computing device, build log lines of the continuous integration job that contain a predetermined character set; and
wherein processing, by the computing device, the extracted target data to generate the at least one standardized dataset in the structured format further comprises:
processing, by the computing device, the build log lines to generate event data associating one or more timestamps with an event type, the event type comprising presence of the predetermined character set.

12. The method of claim 1, further comprising presenting, by the computing device on a display device, user interface imagery that identifies the at least one standardized dataset.

13. The method of claim 1, wherein the machine-learned classifier model generates the label based on performing natural language processing on the at least one standardized dataset.

14. The method of claim 1, wherein the failure feature comprises a failure classification.

15. The method of claim 1, further comprising:
automatically, based on processing, by the computing device and using the machine-learned classifier model, the at least one standardized dataset to generate the label:
determining, by the computing device and responsive to the label, a corrective action based on at least one of a continuous integration corpus or historical data that includes a same failure feature; and
initiating, by the computing device, the continuous integration system to execute the continuous integration job with the corrective action.

16. The method of claim 15, wherein determining, by the computing device and responsive to the label, the corrective action comprises:
determining the corrective action using one or more pull requests that include similar error wording, wherein the corrective action comprises a modification based on the one or more pull requests.

17. The method of claim 15, wherein determining, by the computing device and responsive to the label, the corrective action comprises:
determining to retry the failed continuous integration job based on determining a transience of an error.

18. The method of claim 1, further comprising:
receiving, by the computing device, a label correction from a user; and
training, by the computing device, the machine-learned classifier model based on the label correction.

19. A system comprising:
a computing device comprising a processor device to:
identify a failed continuous integration job of a continuous integration system, the continuous integration system configured to process continuous integration jobs in a shared source code repository;
identify a plurality of artifacts generated by the continuous integration system in relation to the failed continuous integration job;
extract predetermined target data from the plurality of artifacts;
process the extracted target data to generate at least one standardized dataset in a structured format;
access the at least one standardized dataset in the structured format, the at least one standardized dataset compiled from the extracted target data from the plurality of artifacts generated by the continuous integration system in relation to the failed continuous integration job;
apply at least one failure detection process to the at least one standardized dataset to determine at least one failure feature of the at least one standardized dataset, wherein applying the failure detection process comprises:
processing, using a machine-learned classifier model, the at least one standardized dataset to generate a label associated with the failed continuous integration job, wherein the label indicates at least one failure feature;
wherein the machine-learned classifier model was trained using historical continuous integration data; and
store the label in association with the at least one standardized dataset.

20. A computer program product stored on a non-transitory computer-readable storage medium and including instructions to cause a processor device to:
identify a failed continuous integration job of a continuous integration system;
identify a plurality of artifacts generated by the continuous integration system in relation to the failed continuous integration job;
extract predetermined target data from the plurality of artifacts;

process the extracted target data to generate at least one standardized dataset in a structured format;

access the at least one standardized dataset in the structured format, the at least one standardized dataset compiled from the extracted target data from the plurality of artifacts generated by the continuous integration system in relation to the failed continuous integration job;

apply at least one failure detection process to the at least one standardized dataset to determine at least one failure feature of the at least one standardized dataset, wherein applying the failure detection process comprises:

processing, using a machine-learned classifier model, the at least one standardized dataset to generate a label associated with the failed continuous integration job, wherein the label indicates at least one failure feature;

wherein the machine-learned classifier model was trained using historical continuous integration data;

store the label in association with the at least one standardized dataset;

determine a corrective action based on the label; and initiate the continuous integration system to execute the continuous integration job with the corrective action.

* * * * *